US011043986B2

(12) United States Patent
Burton

(10) Patent No.: US 11,043,986 B2
(45) Date of Patent: Jun. 22, 2021

(54) REDUCTION OF CROSS-CAPACITANCE AND CROSSTALK BETWEEN THREE-DIMENSIONALLY PACKED INTERCONNECT WIRES

(71) Applicant: Intel Corporation, Santa Clara, CA (US)

(72) Inventor: Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 16/383,947

(22) Filed: Apr. 15, 2019

(65) Prior Publication Data

US 2019/0245582 A1   Aug. 8, 2019

(51) Int. Cl.
*H04B 3/32* (2006.01)
*G06F 15/173* (2006.01)

(52) U.S. Cl.
CPC ............ *H04B 3/32* (2013.01); *G06F 15/173* (2013.01)

(58) Field of Classification Search
CPC ..... G06F 15/173; H04B 3/32; H01L 21/4846; H01L 21/52; H01L 23/3142; H01L 23/49816; H01L 23/50; H01L 23/528; H01L 23/5381; H01L 23/5383; H01L 23/5385; H01L 23/5386; H01L 24/13; H01L 24/14; H01L 24/16; H01L 24/17; H01L 24/83; H01L 25/0652; H01L 25/0655; H01L 25/18; H01L 25/50; H01L 2224/0401; H01L 2224/131;
(Continued)

(56) References Cited

U.S. PATENT DOCUMENTS 6,137,167 A * 10/2000 Ahn ..................... H01L 25/0652
257/208
9,754,890 B2 * 9/2017 Deshpande ......... H01L 25/0652
(Continued)

FOREIGN PATENT DOCUMENTS

WO   WO 2017/111790   * 6/2017

OTHER PUBLICATIONS

Yin et al., Modular Routing Design for Chiplet-based Systems, IEEE, 13 pages, 2018.*
(Continued)

*Primary Examiner* — Frank Duong
(74) *Attorney, Agent, or Firm* — Schwabe, Williamson & Wyatt, P.C.

(57) ABSTRACT

A mesh interconnect interface includes a dielectric slice; first micro-bumps aligned along a longitudinal axis and positioned closest to a driver bank, which is to be coupled to a first mesh stop of a first chiplet; second micro-bumps similarly aligned and positioned farthest from the first driver bank; third micro-bumps similarly aligned and positioned closest to a second driver bank, which is to be coupled to a second mesh stop of a second chiplet; fourth micro-bumps similarly aligned and positioned farthest from the second driver bank, wherein the longitudinal axis is orthogonal to a gap between the chiplets. The groups of micro-bumps are disposed on the slice. A first group of wires are embedded in the slice to couple the first and second micro-bumps. A second group of wires are interleaved with the first group of wires and embedded in the slice to couple the second and third micro-bumps.

23 Claims, 9 Drawing Sheets

(58) Field of Classification Search
CPC ..... H01L 2224/1412; H01L 2224/1413; H01L 2224/16227; H01L 2224/16235; H01L 2224/1703; H01L 2224/83; H01L 2225/06541; H01L 2225/06548; H01L 2924/1431; H01L 2924/1432; H01L 2924/1433; H01L 2924/1434; H01L 2924/1451; H01L 2924/15192; H01L 2924/15311; H01L 2924/3511; H01L 2924/37001

See application file for complete search history.

(56) References Cited

U.S. PATENT DOCUMENTS

| | | | |
|---|---|---|---|
| 10,748,852 B1* | 8/2020 | Sauter | H01L 23/5256 |
| 10,892,219 B2* | 1/2021 | Pietambaram | H01L 21/565 |
| 2018/0101502 A1 | 4/2018 | Nassif et al. | |
| 2018/0240778 A1* | 8/2018 | Liu | H01L 23/5383 |
| 2019/0206798 A1* | 7/2019 | Collins | H01L 23/5385 |
| 2019/0229056 A1* | 7/2019 | Qian | H01L 23/5383 |

OTHER PUBLICATIONS

Qian et al., Electrical Analysis of EMIB Packages, IEEE, 3 pages, 2018.*

Mahajan et al., Embedded Multi-Die Interconnect Bridge (EMIB)—A High Density, High Bandwidth Packaging Interconnect, IEEE, 9 pages, 2016.*

* cited by examiner

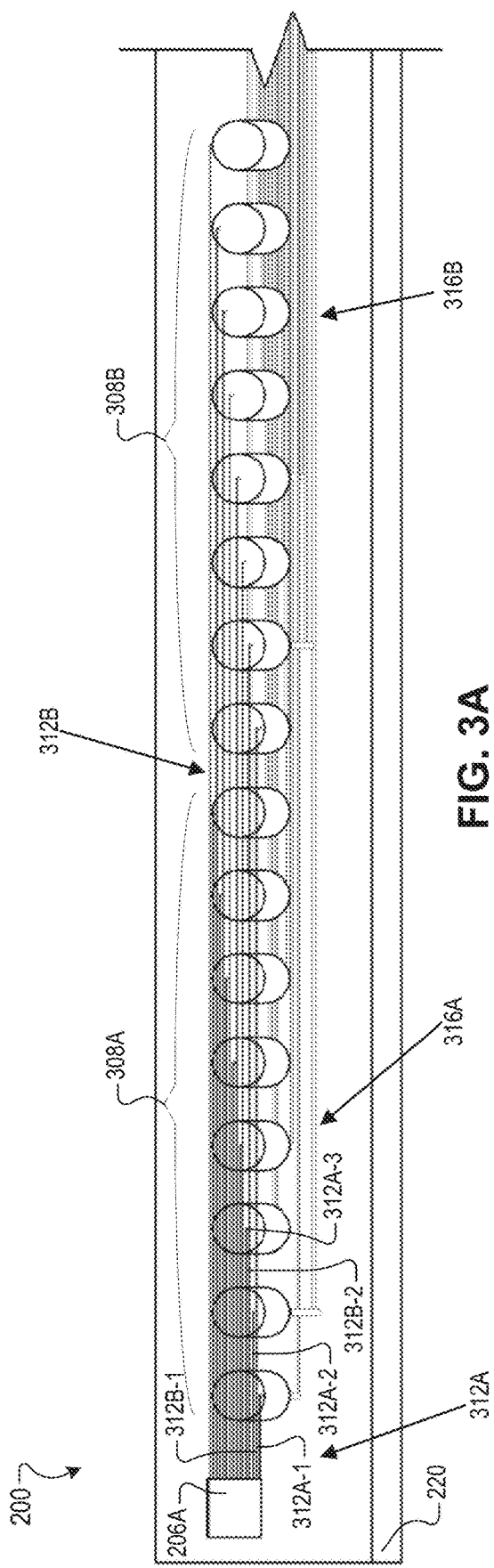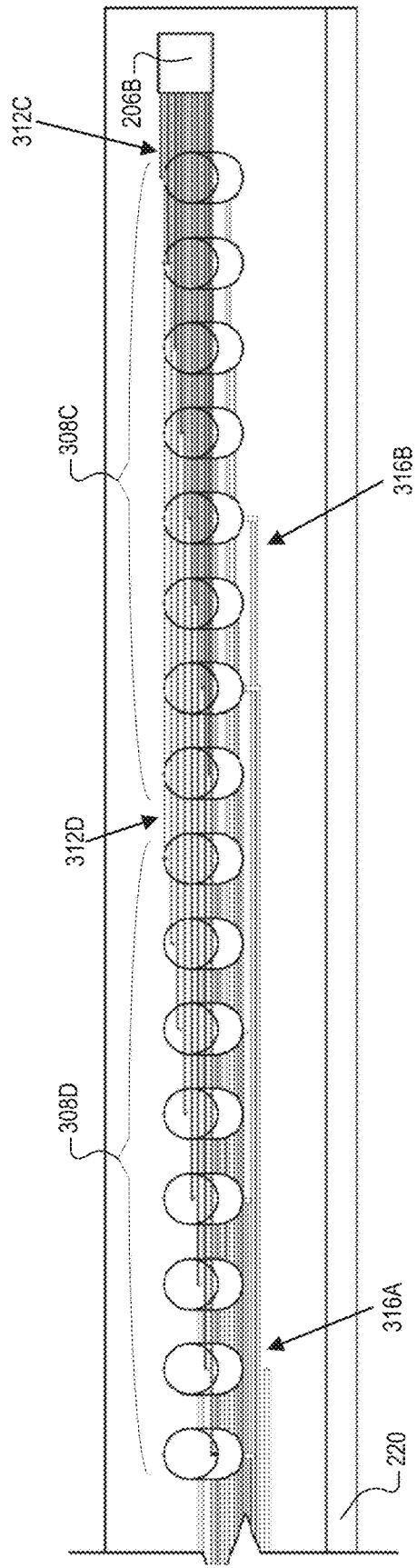

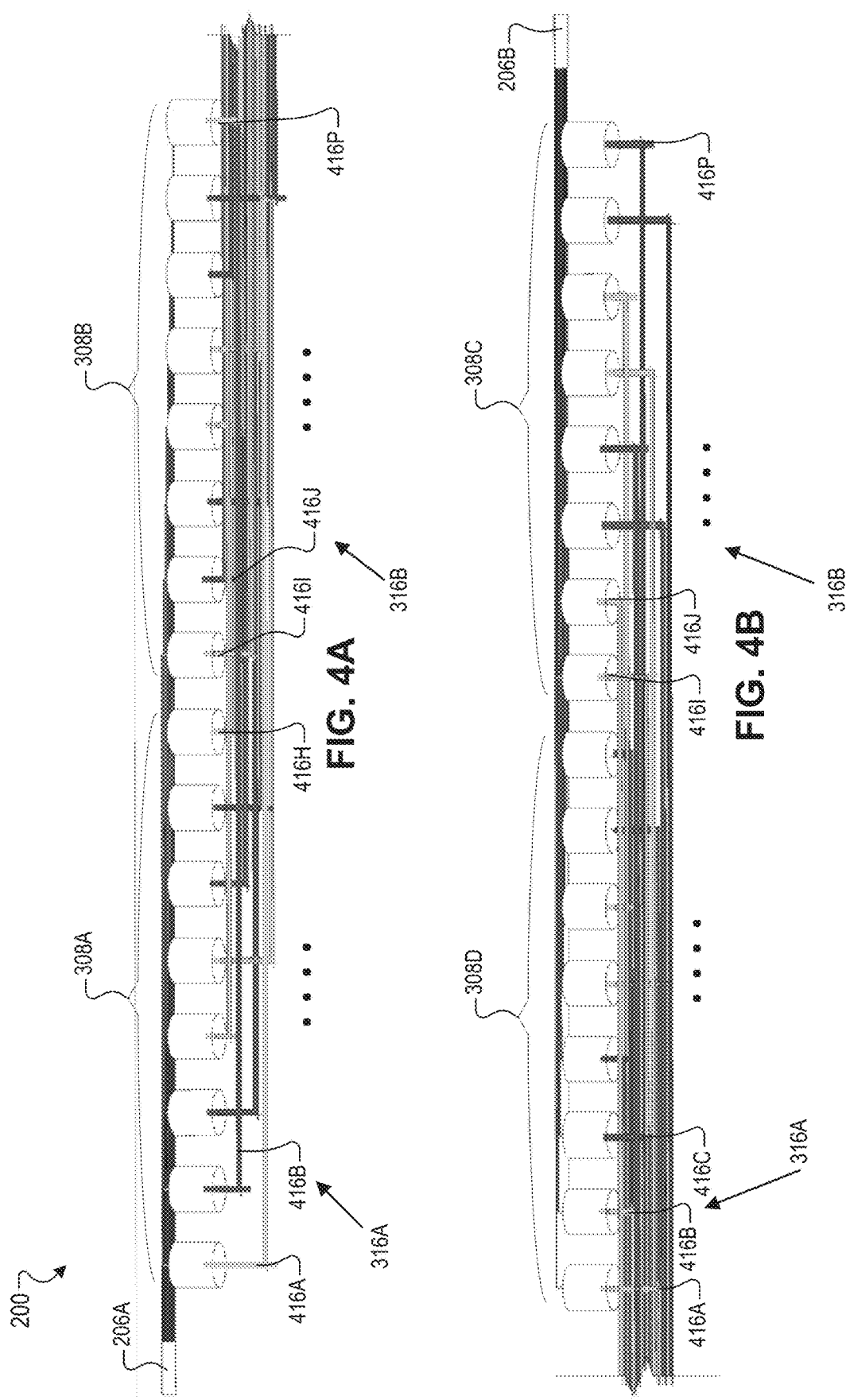

REDUCTION OF CROSS-CAPACITANCE AND CROSSTALK BETWEEN THREE-DIMENSIONALLY PACKED INTERCONNECT WIRES

BRIEF DESCRIPTION OF THE DRAWINGS

FIGS. 3A-3B are top perspective views of the mesh interconnect interface of FIG. 2, according to certain embodiments.

FIGS. 4A-4B are bottom perspective views of the mesh interconnect interface of FIG. 2, according to certain embodiments.

DESCRIPTION OF EMBODIMENTS

Described herein are enhancements to mesh interconnect interfaces manufactured to be embedded within a multi-layered substrate and to interconnect arrays of cores on a multi-core package. An array of cores may be packaged on a single die that may be referred to as a chiplet. For example, a chiplet is an integrated circuit (IC) block that is part of an integrated circuit (chip) that includes multiple such chiplets. In such chips, a system is divided into functional circuit blocks called chiplets, which are usually reusable IC-based blocks on a single semiconductor die. Advantages of the mesh interconnect interfaces will be described below after a brief explanation of a multi-chiplet package.

Figure 1:
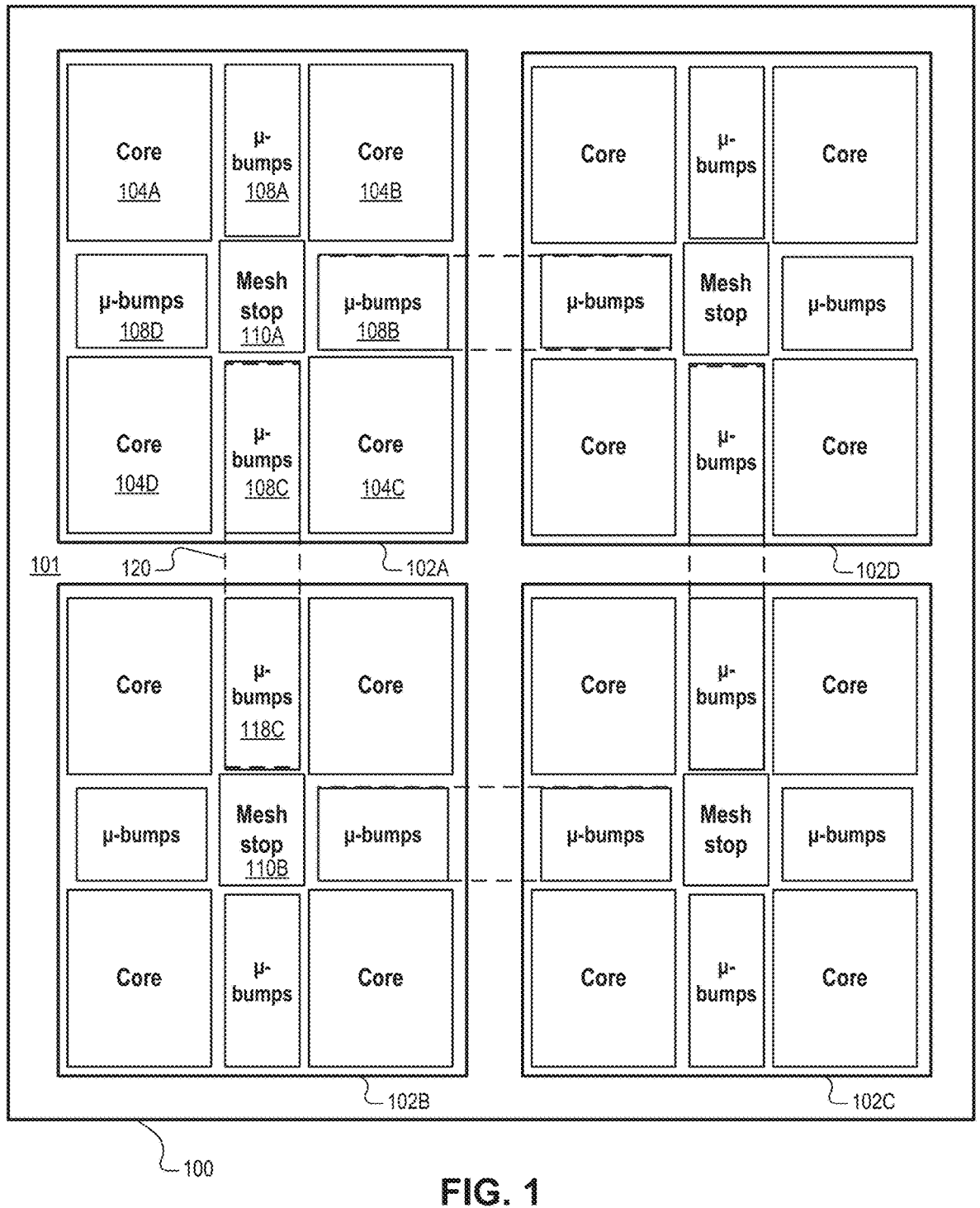
FIG. 1 is a block diagram of a portion of a multi-chiplet package, according to certain embodiments.

FIG. 1 is a block diagram of a portion of a multi-chiplet package 100, according to certain embodiments. One multi-chiplet package 100 may be manufactured to include an arbitrarily large array of chiplets, arranged in rows and columns. The multi-chiplet package 100 therefore illustrates just a corner of such a package having four chiplets for purposes of explanation. The four chiplets may include a first chiplet 102A, a second chiplet 102B, a third chiplet 102C, and a fourth chiplet 102D. Just the first chiplet 102A is further described for purposes of explanation as the other chiplets can be assumed to be identical for purposes of the present disclosure. The second chiplet 102B will also be referred to as the chiplet to which the first chiplet 102B is coupled.

In various embodiments, the first chiplet 102A includes four cores, a first core 104A, a second core 104B, a third core 104C, and a fourth core 104D. The first chiplet 102A may further include a first array of micro-bumps 108A, a second array of micro-bumps 108B, a third array of micro-bumps 108C, and a fourth array of micro-bumps 108D arrayed next to a correspondingly numbered core. The first chiplet 102A may further include a first mesh stop 110A, which includes blocks of transistors to facilitate interconnection between the four cores 104A, 104B, 104C, and 104D, e.g., so that the cores may intercommunicate. The micro-bumps are arrayed in order to interconnect the chiplets, as will be discussed in detail.

First note, however, that the micro-bumps were historically arrayed along an edge of the chiplets in order to connect two chiplets to each other. An architectural interface such as a Multiple Die Fabric Interconnect (MDFI) or the like would be employed that connects the micro-bumps from two chiplets together. The MDFI and other such architectural interfaces use very wide signal busses, with hundreds or thousands of bits. In one example, there may be around 1,500 signals per bus connection, and over 10,000 signals crossing a single die-cut edge. The intent is to cut an array of cores into much smaller groupings, while not paying any die-area or power overhead, e.g., compared to a full monolithic-array.

The historic way of connecting the chiplets, however, includes large two-dimensional arrays of micro-bumps that are located at the periphery of the chiplets, taking up significant additional area. Furthermore, the MDFI employs a four-layer metal stack. Two thirds of the metal plane resources are used for ground returns, with only one third used for signaling. This is because signals crossing an embedded bridge between chiplets are intentionally synchronized (e.g., "source synchronous"), which results in a sudden surge of current, which produces a large amount of noise, e.g., a ground bounce. For purposes of explanation, assume that each wire exhibits a 1 picofared (pF) capacitance, multiplied by 1,500 wires, is a 1.5 nanofared (nF) capacitance, which needs to be discharged through the ground returns. It takes about 50 amperes to discharge a 1.5 nF capacitor by one volt in 30 picoseconds (ps). Inductive noise (ground bounce) is proportional to the derivative of current with respect to time (di/dt), so a rapid surge of current requires very robust (and expensive) return current paths. In various embodiments, the wire capacitance is reduced by a factor of two or more due to the removal of ground planes from the bridge area. Signal-switching is also spread across a much larger time period. The result is a much smaller derivative of current with respect to time, and correspondingly reduced inductive noise. The return current required to transition each signal can often be carried by its neighboring signals, which are topologically guaranteed to be driving a static high or low signal (Vcc or Vss). This eliminates or reduces the demand for explicit ground or power planes to carry return currents.

As a result of the large return currents, MDFI or similar implementations dedicate a large fraction of the metal plane layers to ground return current. The additional metal for ground returns increases signal capacitance, which increases power. The sudden surge of current associated with MDFI interface implementation has required about a 20-25% increase in the number of micro-bumps to couple power and ground for crosstalk control. Synchronizing all signals across the two-dimensional array of micro-bumps costs both power and latency. The MDFI cost for dividing a large part into quadrants may be over ten percent of the silicon die area.

In an effort to reduce cross-capacitance and crosstalk, which would significantly reduce, or eliminate, the amount of the metal plane layers dedicated to return current, a number of changes may be made to a mesh interconnect interface as is currently employed. Together, those changes reduce the total signal capacitance, and spread the signal capacitance discharge over a much larger time. The resulting current surge is small enough that the ground return planes and micro-bumps can be reduced, or even eliminated.

First, the micro-bumps may be moved to an area on top of the cache on each chiplet. Although not illustrated, each set of micro-bumps are arrayed on top of large cache arrays, positioned between the cores on the chiplet. Furthermore, in various embodiments, arrayed micro-bumps of two adjacent chiplets are coupled across a portion 120 of a multi-layer substrate 101, which employs through-silicon vias (TSVs) to pass signals and power between the multi-chiplet package 100 and the chiplets.

In another embodiment, the arrays of micro-bumps are disposed on a dielectric bridge, which is embedded in the multi-layer substrate 101 of the multi-chip package 100. In these embodiments, the arrays of micro-bumps may be coupled to each other using wires in square-packed (FIGS. 5A-5B) or a hexagonal-packed (FIG. 6) arrangement, for example, which further reduces cross-capacitance and crosstalk. In one embodiment, wires from a driver bank are alternatively coupled to micro-bumps located in different groups of micro-bumps that are arrayed along each column of micro-bumps between two chiplets, e.g., between the first chiplet 102A and the second chiplet 102B, as will be discussed in more detail with reference to FIGS. 2, 3A-3B, and 4A-4B. A "column" is understood to be a line of micro-bumps arrayed along a longitudinal axis that is orthogonal to a gap between the two chiplets. In one embodiment, the portion 120 of the multi-layer substrate 101 is made of a silicon-based material, but may be made of other dielectric materials as well.

In various embodiments, and in a further effort to reduce cross-capacitance and crosstalk, the wires that interconnect sets of micro-bumps embedded within the portion 120 of the multi-layer substrate 101 are arrayed and interconnected in one of a number of ways, such that nearest neighbor wires of each wire are to pass signals at different times. In other words, a particular wire may have a number of nearest neighbor wires (e.g., four nearest neighbor wires in a square-packed array, or six nearest neighbor wires in a hex-packed array) that switch before or after the particular wire due to the switching delays built into to staggered and interleaved micro-bump connections. These wire connection schemes within the portion 120 of the multi-layer substrate 101 are discussed in more detail with reference to FIGS. 5A-5B and 6.

Figure 2:
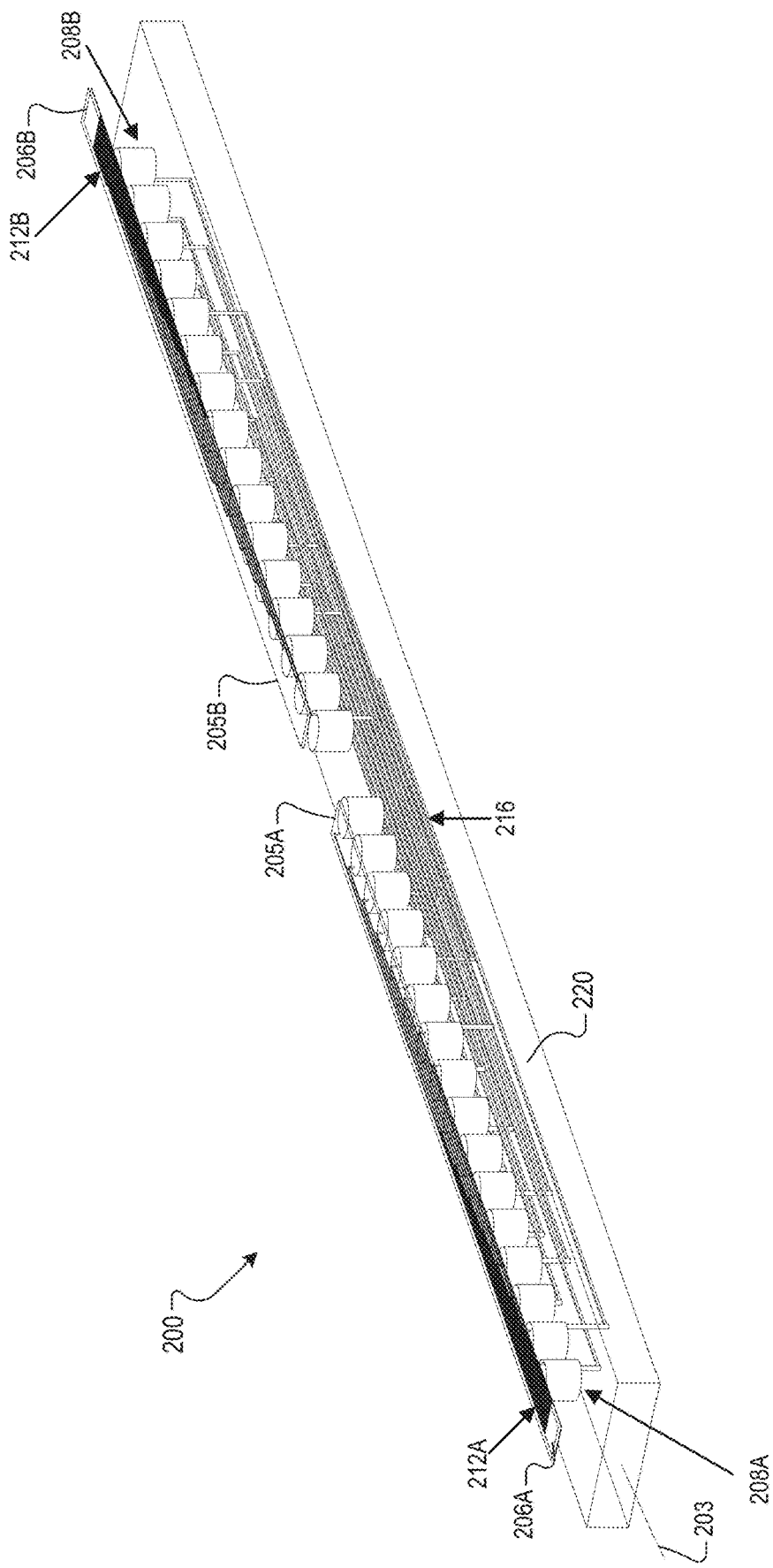
FIG. 2 is a side perspective view of a mesh interconnect interface, according to certain embodiments.

FIG. 2 is a side perspective view of a mesh interconnect interface 200, according to certain embodiments. The mesh interconnect interface 200 may include a dielectric slice 220 of the portion 120 of the multi-layer substrate 101 of the multi-chiplet package 100 (FIG. 1). In other words, the slice 220 illustrated in FIG. 2 carries only a single column of the micro-bumps to facilitate explanation herein, but many more columns of micro-bumps are arrayed across the portion 120 of the multi-layer substrate in a two-dimensional array of micro-bumps. The mesh interconnect interface 200 may further include a first chiplet cutout 205A, a second chiplet cutout 205B, a first driver bank 206A at a first end of the first chiplet cutout 205A, and a second driver bank 206B at a first end of the second chiplet cutout 205B. Each driver bank is understood to include drivers, receivers, and bidirectional input/output (I/O) devices, where in some cases, a driver bank acts as a driver and, in other cases, as a receiver. The chiplet cutouts are not shown in FIGS. 3A-3B and 4A-4B so that other structures are better visible. Further, the first chiplet cutout 205A may be understood to be a slice of the first chiplet 102A and the second chiplet cutout 205B may be understood to be a slice of the second chiplet 102B, to which the mesh interconnect interface 200 is interconnecting.

In embodiments, each of the first driver bank 206A and the second driver bank 206B may include signal latches for sending and receiving signals using common-clock timing (e.g., the same clock frequency at minimal phase difference). In this way, the signals may also be synchronized when the signals leave a driver bank. The first driver bank 206A may be coupled to the first mesh stop 110 of the first chiplet 102A and the second driver bank 206B may be coupled to a second mesh stop 110B of the second chiplet 102B. For purposes of explanation, as depicted in FIG. 1, the mesh interconnect interface 200 may further include a first set of micro-bumps 208A (e.g., a column slice of the third array of micro-bumps 108C illustrated FIG. 1) that is to overlay cache of the first chiplet 102A and a second set of micro-bumps 208B (e.g., a column slice of a fifth set of micro-bumps 118C illustrated in FIG. 1) that is to overlay cache of the second chiplet 102B. The first and second sets of micro-bumps 208A and 208B may be aligned along a longitudinal axis 203, e.g., in a column, that is generally defined by a length of the dielectric slice 220.

In various embodiments, the mesh interconnect interface 200 further includes a first set of wires 212A disposed on the first chiplet cutout 205A to couple the first driver bank 206A to respective ones of the first set of micro-bumps 208A. The mesh interconnect interface 200 further includes a second set of wires 212B disposed on the second chiplet cutout 205B to couple the second driver bank 206B to respective ones of the second set of micro-bumps 208B. In different embodiments, the wires of the first and second sets of wires may be microstrip traces, metal leads, or other connector traces capable of transmitting and receiving electrical signals. The first and second set of wires 212A and 212B (e.g., chiplet wires) may be very fine (sub-micron in width, e.g., 100 nm), and thus be significantly resistive, which makes the chiplet wires resistive-capacitive (RC)-dominated and thus slow for signals. As a result, the chiplet wires may be periodically repeated through gain stages (usually complementary metal-oxide semiconductor (CMOS) inverters), which are not shown for purposes of simplifying the Figures. The mesh interconnect interface 200 further includes a third set of wires to couple the first set of micro-bumps 208A to the second set of micro-bumps 208B within the dielectric slice 220, which are therefore embedded within the dielectric slice 220. The wires of the third set of wires 216 may be thicker than the wires of the first and second sets of wires 212A and 212B, and signals may therefore travel about 10-20 times faster through the third set of wires compared to the first and second set of wires. In other words, the wires of the first and second sets of wires 212A and 212B may have less than one tenth the cross-sectional area compared to the third set of wires 216.

It should be noted that although the mesh interconnect interface 200 is illustrated with a particular number of micro-bumps, which drives the number of interconnect wires to couple the micro-bumps between the first driver bank 206A, the second driver bank 206B, and to each other via the dielectric slice 220, this number of micro-bumps is for each of discussion only. As discussed, in an actual mesh interconnect interface, the number of micro-bumps would be multiplied greatly (e.g., in longer columns) and would be arrayed in two dimensions. Accordingly the mesh interconnect interface 200 that is depicted includes only a single column of the micro-bumps in order to explain one slice of the overall mesh interconnect interface that may exist.

FIGS. 3A-3B are top perspective views of the mesh interconnect interface 200 of FIG. 2, according to certain embodiments. With initial focus on FIGS. 3A-3B, in various embodiments, the first set of micro-bumps 208A include a first group of micro-bumps 308A aligned along the longitudinal axis 203 (FIG. 2) and positioned closest to the first driver bank 206A, the first driver bank to be coupled to the first mesh stop 110A of a first chiplet 102A. The first set of micro-bumps 208A may further include a second group of micro-bumps 308B aligned along the longitudinal axis and positioned farthest from the first driver bank 206A.

With additional focus on FIG. 3B, the second set of micro-bumps 208B may include a third group of micro-bumps 308C aligned along the longitudinal axis and positioned closest to the second driver bank 206B, the second driver bank to be coupled to the second mesh stop 110B of the second chiplet 102B. The second set of micro-bumps 208B may further include a fourth group of micro-bumps 208D aligned along the longitudinal axis 203 (FIG. 2) and positioned farthest from the second driver bank 206B. The longitudinal axis 203 may be orthogonal to a gap between the first chiplet 102A and the second chiplet 102B. Further, the first, second, third, and fourth groups of micro-bumps 308A, 308B, 308C, and 308D may be disposed on the dielectric slice 220.

In embodiments, the third set of wires 216 (FIG. 2) includes a first group of wires 316A embedded in the dielectric slice to couple the first group of micro-bumps 308A to the fourth group of micro-bumps 308D, and a second group of wires 316B embedded in the dielectric slice to couple the second group of micro-bumps 308B to the third group of micro-bumps 308C. These first and second groups of wires 316A and 316B will be discussed in more detail with reference to FIGS. 4A-4B.

In further embodiments, the first set of wires 212A (FIG. 2) further includes a third group of wires 312A to couple the first driver bank 206A to the first group of micro-bumps 308A and a fourth group of wires 312B to couple the first driver bank 206A to the second group of micro-bumps 308B, wherein respective ones of the third group of wires 312A are interwoven with respective ones of the fourth group of wires 312B. For example, as the wires sequentially leave the first driver bank 206A, a wire from the third and fourth groups of wires may alternate in a single plane so that each wire of the third group of wires (except for the first wire) is positioned between two wires of the fourth group of wires.

More specially, in one embodiment, a first wire 312A-1 from the third group of wires 312A may be may be coupled to a first micro-bump of the first group of micro-bumps, the first micro-bump positioned closest to the first driver bank. Further, a second wire 312A-2 of the third group of wires is coupled to a second micro-bump of the first group of micro-bumps 308A, the second micro-bump positioned second closest to the first driver bank. Further, a third wire 312A-3 of the third group of wires is coupled to a third micro-bump of the first group of micro-bumps 308A, the third micro-bump positioned third closest to the first driver bank.

As to the interleaving fourth group of wires 312B in this embodiment, a first wire 312B-1 of the second group of wires 312B is positioned between the first and second wires 312A-1 and 312A-2 of the first group of wires at the first driver bank and is coupled to a first micro-bump of the second group of micro-bumps 308B. The first micro-bump of the second group of micro-bumps 308B may be positioned closest to the first driver bank. Further, a second wire 312B-2 of the second group of wires 312B is positioned between the second and third wires 312A-2 and 312A-3 of the first group of wires 312A and is coupled to a second micro-bump of the second group of micro-bumps 308B. The second micro-bump of the second group of micro-bumps 312B is positioned second closest to the first driver bank. This interleaving may continue such that the shorter wires of the first group of wires 312A are sequentially interleaved with the longer wires of the second group of wires 312B, enabling a length of at least some of each wire being unpopulated (e.g., free of) a nearest neighbor wire, which may thereby reduce cross-capacitance and crosstalk between the wires.

In various embodiments, because the third and fourth groups of wires 312A and 312B are so fine, and thus slow, as discussed before, the signals passing over the longer wires are more delayed than those passing over the shorter wires. This difference in delay creates different times at which the signals transition through a micro-bump and into the dielectric slice 220. Different timing of these transitions will further decrease crosstalk between the first and second groups of wires 316A and 316B passing through the dielectric slice.

In embodiments, the second driver bank 206B is to feed signals to the second set of wires 212B (FIG. 2) that interconnect the second driver bank 206B to the second chiplet 102B, which is coupled to the third and fourth groups of micro-bumps 308C and 308D. The second set of wires 212B may include a fifth group of wires 312C and a sixth group of wires 312D that interleave in their coupling between the second driver bank 206B and the third and fourth groups of micro-bumps 308C and 308D, similarly as was discussed with reference to the third and fourth groups of wires. In one embodiment, wires of the third and fourth groups of wires 312A and 312B have an identical cross-sectional area as the wires of the fifth and sixth groups of wires 312C and 312D.

More specially, a first wire of the fifth group of wires 312C is coupled to a first micro-bump of the third group of micro-bumps (which is positioned closest to the second driver bank), and a second wire of the fifth group of wires 312C is coupled to a second micro-bump of the third group of micro-bumps (which is positioned second closest to the second driver bank). Further, a first wire of the sixth group of wires 312D is coupled to the first micro-bump of the fourth group of the micro-bumps 308D (which is positioned closest to the second driver bank) and is positioned between the first and second wires of the fifth group of wires 312C. Further, a second wire of the sixth group of wires 312D is coupled to the second micro-bump of the fourth group of the micro-bumps 308D and is positioned between the second wire and a third wire of the fifth group of wires 312C. This interleaving may continue such that the shorter wires of the fifth group of wires 312C are sequentially interleaved with the longer wires of the sixth group of wires 312B, enabling a length of at least some of each wire being free of a nearest neighbor wire, thus reducing cross-capacitance and crosstalk between the wires.

In various embodiments, because the fifth and sixth groups of wires 312C and 312D are so fine, and thus slow, as discussed before, the signals passing over the longer wires are more delayed than those passing over the shorter wires. This difference in delay creates different times at which the signals transition through a micro-bump and into the dielectric slice 220. Different timing of these transitions will further decrease crosstalk between the first and second groups of wires 316A and 316B passing through the dielectric slice.

While various embodiments have described examples in which the first and second groups of wires 316A and 216B within the dielectric slice 220 are communicating in the same direction (e.g., outputs from chiplet 102A connected to inputs on chiplet 102B), it will be apparent to one skilled in the art that the first and second groups of wires 316A and 316B may communicate groups of signals in opposite directions, either at the same time or at different times.

FIGS. 4A-4B are bottom perspective views of the mesh interconnect interface 200 of FIG. 2, according to certain embodiments. Referencing back also to FIGS. 3A-3B, the first group of wires 316A may couple the first group of micro-bumps 308A to the fourth group of micro-bumps 308D within the dielectric slice 220. The dielectric slice 220 is not illustrated here to not obscure the wires discussed with reference to FIGS. 4A-4B. The second group of wires 316B may couple the second group of micro-bumps 308B to the third group of micro-bumps 308C within the dielectric slice 220.

More specially, the first group of wires 316A may include a first wire 416A to couple a first micro-bump of the first group of micro-bumps 308A that is closest to the first driver bank to a last micro-bump of the fourth group of micro-bumps 308D that is farthest from the second driver bank; a second wire 416B to couple a second micro-bump of the first group of micro-bumps 308B that is second closest to the first driver bank to a second last micro-bump of the fourth group of micro-bumps 308D that is second farthest from the second driver bank; and so forth until a last wire 416H to couple a last micro-bump of the first group of micro-bumps 308A that is farthest from the first driver bank to a first micro-bump of the fourth group of micro-bumps 308D that is closest to the second driver bank. In this way, the wires of the first group of wires 316A are kept of substantially equal length as they cross the dielectric slice 220.

Furthermore, the second group of wires 316B may include a first wire 416I to couple a first micro-bump of the second group of micro-bumps 308B that is closest to the first driver bank to a last micro-bump of the third group of micro-bumps 308C that is farthest from the second driver bank; a second wire 416J to couple a second micro-bump of the second group of micro-bumps 308B that is second closest to the first driver bank to a second last micro-bump of the third group of micro-bumps 308C that is second farthest from the second driver bank; and so forth until a last wire 416P to couple a last micro-bump of the second group of micro-bumps 308B that is farthest from the first driver bank to a first micro-bump of the third group of micro-bumps 308C that is closest to the second driver bank. In this way, the wires of the second group of wires 316B are kept of equal length as they cross the dielectric slice 220.

In embodiments of the mesh interconnect interface 200, the signals crossing the wires on top of the first and second chiplets 102A and 102B may be variably delayed depending on how long the wires are to respective micro-bumps to which the wires are coupled. So, while signals are switched onto the wires on the top of the micro-bumps source-synchronously by the first driver bank 206A and are received source-synchronously at the second driver bank 206B, the signals may become relatively skewed while entering and traversing the dielectric slice 220. In this way, timing overlap may be created via spatially shifting of the wires carrying the signals as will be further explained.

For purposes of explanation, imagine a group of synchronized chiplet signals propagating at 100 picosecond (ps)/millimeter (mm) as they travel above a long column of micro-bumps, which occur at a 50 μm pitch. If the first micro-bump is right at the origination point for the driver bank 206A, its signal enters the dielectric slice 220 at time=0. The signal entering the dielectric slice 220 through the second micro-bump in the column will do so at time=5 ps. The third signal will enter at the third micro-bump at time=10 ps, and so on. If the signal switches are at 15 ps, then no more than three consecutive micro-bumps in the column of micro-bumps will be switching at any given time. If the array of micro-bumps is of many such columns along-side each other, then one may assume that no more than three rows of micro-bumps (in the entire array of micro-bumps) switch at any given time.

As discussed previously, simultaneously switching a large two-dimensional array of drivers (within the driver banks) requires a large current pulse during the time the signals are switching, which creates a large change in current per unit time, and therefore a lot of inductive supply noise, which also causes circuit slow-down. By reducing the number of rows of micro-bumps that switch signals at the same time, the discharge current is spread over a much larger time (e.g., 100 ps for a 1 mm column of micro-bumps). Spreading a fixed charge pulse of a seven times larger duration (100 ps/15 ps) decreases the current magnitude by seven times and increases the time by a magnitude of seven, which results in approximately 49 times smaller change in current per unit time by this simplified example.

In embodiments, as can be seen visually in FIGS. 4A and 4B, the wires of the first and second groups of wires 316A and 316B are interleaved spatially, and due to the staged nature of connecting across the micro-bumps arrayed along the length of the dielectric slice 220, wires of the first and second groups of wires 316A and 316B each have nearest neighbors of approximately fifty percent of their lengths. Furthermore, the first and second groups of wires 316A and 316B that traverse the dielectric slice 220 may be interleaved spatially in any number of rasterized organizations that enable nearest neighbor wires to switch (e.g., pass) signals at different times. Both the spatial interleaving to have isolated wires and the temporally-rastered organization of the wires packed into the dielectric slice 220 reduces cross-capacitance and crosstalk between the mesh of wires. Furthermore, in one embodiment, nearest neighbor wires of a wire of the first group of wires have mutually non-overlapping lengths with the wire of approximately fifty percent, and nearest neighbor wires of a wire of the second group of wires have mutually non-overlapping lengths with the wire of approximately fifty percent.

In embodiments, the spaces (e.g., physical track locations) that are not filled with wires (due to the staggered and interleaved nature of the wire connections between the first and second sets of micro-bumps) are backfilled with ground shields. Backfilled means that the portion of the physical track location which would normally be depopulated (e.g., empty) gets filled with a grounded trace rather than being empty. Silicon process engineers may require a minimum wire-density, which would preclude the ultra-low base-die density at the first rows of micro-bumps that would result by replicating the mesh interconnect interface 200 across two dimensions. Backfilling empty half-empty tracks with ground segments yields a uniform wire density, while simultaneously creating a more robust ground. The downside is higher capacitance, which may increase power and degrade the signal switches through higher RC attenuation of the signals. Accordingly, in some embodiments, the empty physical tracks may not be backfilled to avoid such degradation.

Figure 5A:
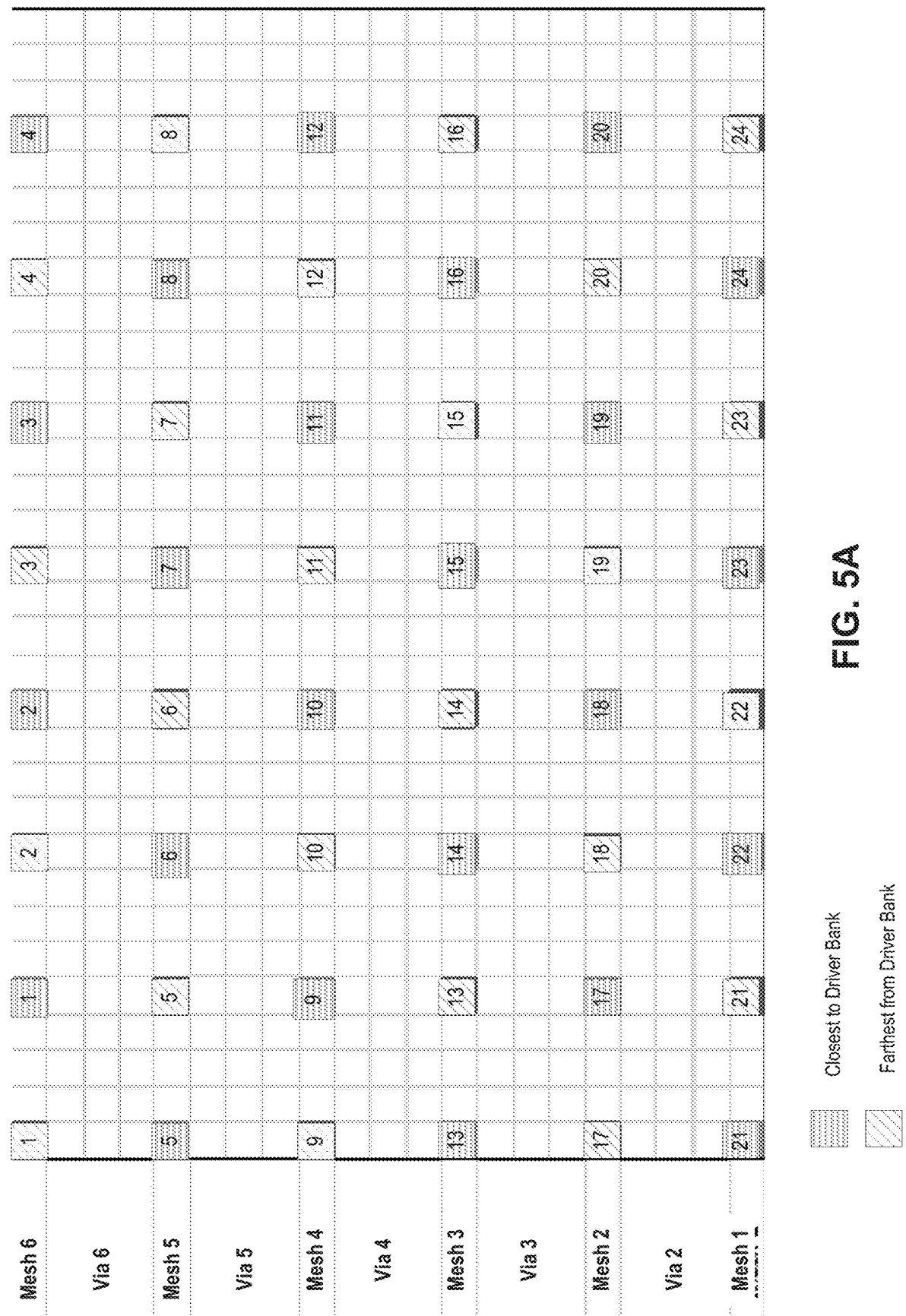
FIG. 5A is a cross-section view of a dielectric slice portion of the mesh interconnect interface of FIG. 2 between sets of micro-bumps, according to one square-packed, horizontal-raster-track-ordering embodiment.
Figure 5B:
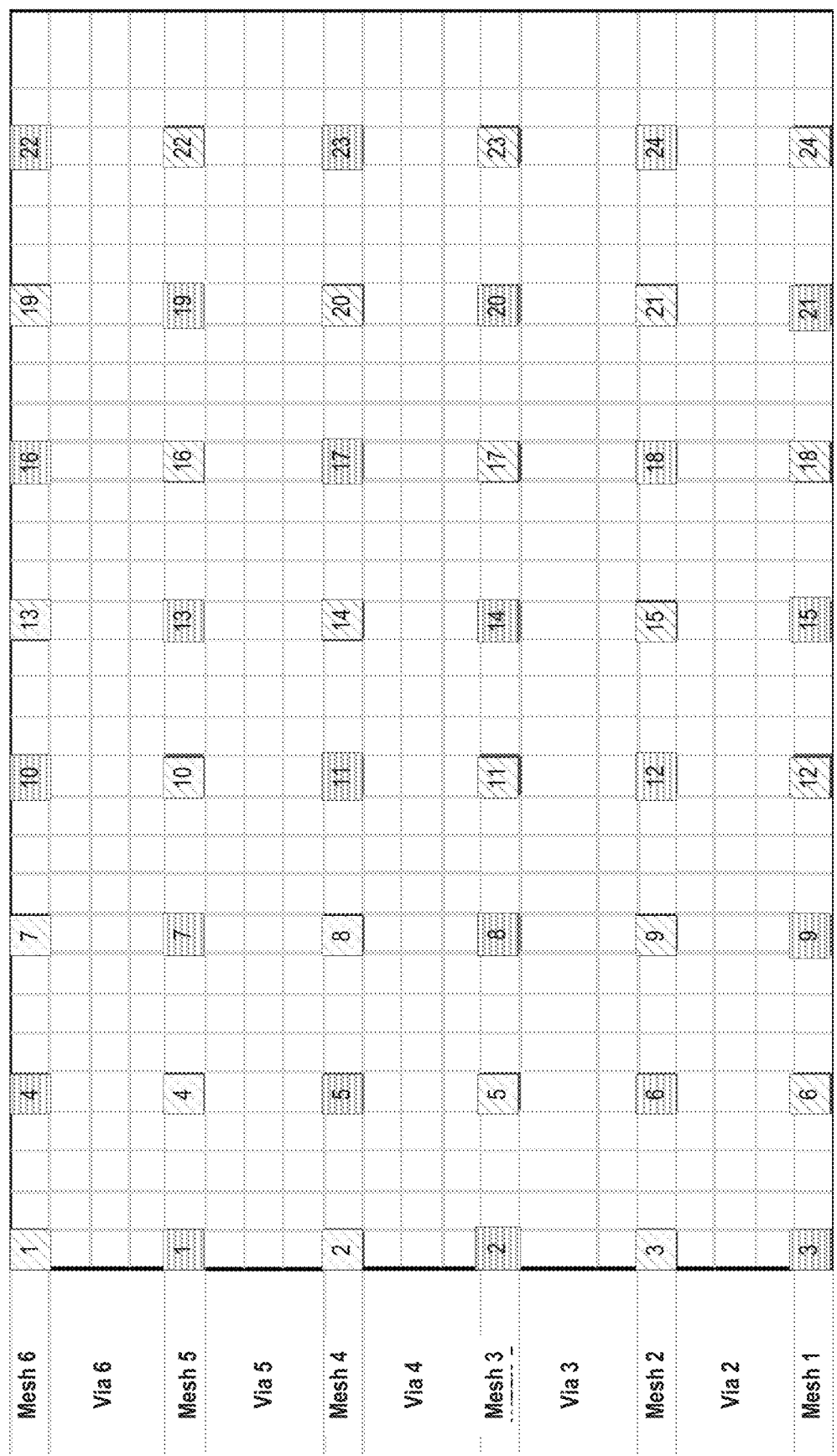
FIG. 5B is a cross-section view of a dielectric slice portion of the mesh interconnect interface of FIG. 2 between sets of micro-bumps, according to one square-packed, vertical-raster-track-ordering embodiment.

FIG. 5A is a cross-section view of a dielectric slice portion of the mesh interconnect interface 200 of FIG. 2 between the first and second sets of micro-bumps 208A and 208B, according to one square-packed, horizontal-raster-track-ordering embodiment. FIG. 5B is a cross-section view of a dielectric slice portion of the mesh interconnect interface 200 of FIG. 2 between sets of micro-bumps, according to one square-packed, vertical-raster-track-ordering embodiment.

The cross-section view of FIGS. 5A-5B may exist within the dielectric slice 220 below the gap that exists between the first set of micro-bumps 208A and the second set of micro-bumps 208B (FIG. 2), and thus below the gap between the first and second chiplets 102A and 102B (FIG. 1). The example illustrated in FIGS. 5A-5B is a cross-section of a square-packed arrangement of the first and second groups of wires 316A and 316B (FIGS. 3A-3B) within the dielectric slice 220. The example of FIG. 5A further applies a horizontal raster track ordering of the first and second groups of wires 316A and 316B while the example of FIG. 5B further applies a vertical raster track ordering of the first and second groups of wires 316A and 316B. The examples of FIGS. 5A-5B correspond to an embodiment of a mesh interconnect interface with 48 micro-bumps (24 micro-bumps on each half), but the approach is the same with the earlier embodiments herein that depict 32 micro-bumps (16 micro-bumps on each half).

As can be seen in FIGS. 5A-5B, each wire of the first group of wires 316A is labeled with a shading indicating these are "closest to the driver bank" and each wire of the second group of wires 316B is labeled with a shading indicating these are "farthest from the driver bank," where the reference may be to either the first or the second driver bank as the mesh interconnect interface is symmetrical between the first and second driver banks 206A and 206B. The lowest numbers (such as 1, 2, 3, . . . ) are closest to the driver bank and the higher numbers (e.g., 24, 23, 22, . . . ) are farthest from the driver bank, e.g., corresponding to the relative micro-bump locations to which the wires are coupled.

For a typical chiplet metal system, there may be around 100 ps difference in the arrival times of signals at a given micro-bump for the first group of wires 316A and the same numbered micro-bump in the second group of wires group 316B, where the latter is about 1 mm farther from the driver bank than the former. The horizontally-rastered version may result in two nearest neighbor wires (left and right) switching with mutually similar timing, and the other two nearest neighbor wires (up and down) switching about 20 ps leading and 20 ps lagging the first pair of nearest neighbor wires, respectively. In one example (FIG. 5A), assume focus at wire numbered five in the second group of wires 316B, the two nearest neighbors in the horizontal plane are wires numbered five and six of the first group of wires 316A and the two nearest neighbors in the vertical plane are wires numbered one and nine of the first group of wires 316A. Accordingly, the wires numbered five and six may have mutually similar timing while the wires numbered one may lead switching by 20 ps and the wire numbered nine may lag switching by 20 ps. A similar set of timing of switching may occur in the example of FIG. 5B, but analyzed vertically across the dielectric slice 220.

Advantageously, whether analyzing the horizontal raster ordering of FIG. 5A or the vertical raster ordering of FIG. 5B, within multiple layers of the dielectric slice in a square-packed arrangement, no nearest neighbor wire of a wire of the first group of wires 316A is of the first group of wires, and no nearest neighbor wire of a wire of the second group of wires 316B is of the second group of wires. In this way, the nearest neighbor wires should not transition at the same time as the wire in the middle of those nearest neighbor wires. In embodiments, roughly half the length of each wire will have depopulated neighbors. The depopulated portion can be backfilled with ground shields, as was discussed. In either case, only a modest number of power and ground micro-bumps may need to be added to the first and second sets of micro-bumps 208A and 208B arrayed in FIG. 2, e.g., enough to power the chiplet logic, through a lower substrate layer such as an interposer.

Figure 6:
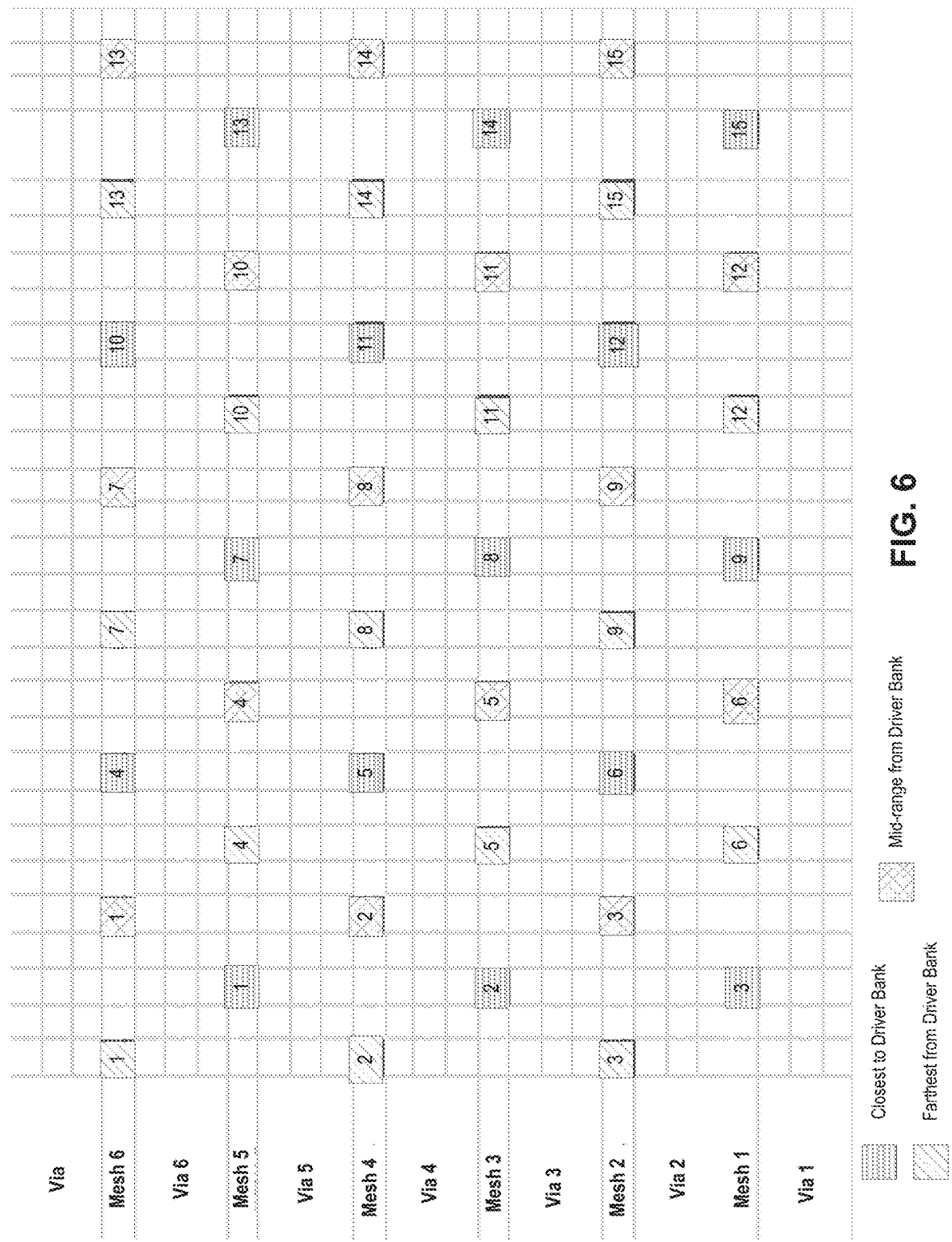
FIG. 6 is a cross-section view of a dielectric slice portion of the mesh interconnect interface of FIG. 2 between sets of micro-bumps, according to one hexagonal-packed, vertical-raster-track-ordering embodiment.

FIG. 6 is a cross-section view of a dielectric slice portion of the mesh interconnect interface of FIG. 2 between sets of micro-bumps, according to one hexagonal-packed, vertical-raster-track-ordering embodiment. In a hexagonal-packed arrangement, the arrayed first set of micro-bumps 208A may be partitioned into three groups of micro-bumps (instead of two groups of micro-bumps) and the arrayed second set of micro-bumps 208B may also be partitioned into three groups of micro-bumps. Each of these two sets of three groups of micro-bumps may then be coupled with a first group of wires, a second group of wires, and a third group of wires respectively. The first group of wires may be those "closest to the driver bank," the second group of wires may be those "farthest from the driver bank," and the third group of wires may those in the "mid-range from the driver bank," as per the shaded legend of FIG. 6.

For purposes of further explanation, these further groups of micro-bumps and wires may be organized as follows in one embodiment. A first group of micro-bumps is aligned along the longitudinal axis 203 and positioned closest to the first driver bank 206A, the first driver bank to be coupled to the first mesh stop 110A of the first chiplet 102A. A second group of micro-bumps is aligned along the longitudinal axis and positioned farthest from the first driver bank. A third group of micro-bumps is aligned along the longitudinal axis and positioned between the first and second groups of micro-bumps. A fourth group of micro-bumps is aligned along the longitudinal axis and positioned closest to the second driver bank 206B, the second driver bank to be coupled to the second mesh stop 110B of the second chiplet 102B. A fifth group of micro-bumps is aligned along the longitudinal axis and positioned farthest from the second driver bank. A sixth group of micro-bumps is aligned along the longitudinal axis and positioned between the fourth and fifth group of micro-bumps, where the longitudinal axis is orthogonal to a gap to be defined between the first and second chiplets, and where the first, second, third, fourth, fifth, and sixth groups of micro-bumps are disposed on the dielectric slice 220. A first group of wires is embedded in the dielectric slice to couple the first group of micro-bumps to the fifth group of micro-bumps. A second group of wires is embedded in the dielectric slice to couple the third group of micro-bumps to the sixth group of micro-bumps. A third group of wires is embedded in the dielectric slice to couple the second group of micro-bumps to the fourth group of micro-bumps.

In a further embodiment, within the dielectric slice 220 between the second and fifth groups of micro-bumps, the first group of wires, the second group of wires, and the third group of wires are interleaved within multiple layers of the dielectric slice in a hexagonal-packed arrangement. Further, no nearest neighbor wire of a wire of the first group of wires is of the first group of wires, no nearest neighbor wire of a wire of the second group of wires is of the second group of wires, and no nearest neighbor wire of a wire of the third group of wires is of the third group of wires.

In this way, each wire within the hexagonally-packed wires has nearest neighbor wires only of the other two groups of wires. For example, with focus on wire numbered four of the second group of wires (FIG. 6), its nearest neighbors are, from left to right going clockwise: the first wire of the first group of wires, the first wire of the third group of wires, the fourth wire of the first group of wires, the fourth wire of the third group of wires, the fifth wire of the first group of wires, and the second wire of the third group of wires. None of these wires are of the second group of wires. In this way, the nearest neighbor wires should not switch at the same time as the wire in the middle of those nearest neighbor wires. Indeed, at most three of the wire's nearest neighbors will switch at a similar time (e.g., wires numbered 4-5 or wires numbered 1-2). Furthermore, about 67% of the wires have depopulated nearest neighbor wires for a third of their signal length. In this way, only about three or four adjacent rows of micro-bumps may switch at about the same time. This timing may be forced by topology, e.g., the RC line delay and distance from the driver bank to the micro-bump that transitions in and out of the dielectric slice 220.

Further by way of example, suppose the hexagonally-packed wires service columns of 45 micro-bumps each, at 50 μm pitch, and the chiplet's signal velocity is 100 ps per millimeter (mm). Signals synchronously leaving the driver bank may arrive at the first micro-bump of the third group of micro-bumps 75 ps after the first micro-bump of the first group of micro-bumps, and 75 ps prior to the first micro-bump of the second group of micro-bumps. For any one of the wires of the third group of wires shown in FIG. 6, three nearest neighbor wires may switch 60-80 ps before the wire switches and three nearest neighbor wires may switch 60-80 ps after the wire switches. A bridge or interposer bus can typically be designed with under 40 ps transit times, which means the nearest neighbor wires are driving static highs and lows while the wire's signals crosses the dielectric slice 220. The nearest neighbor wires therefore may serve as a reasonable path for "return current," which may eliminate (or drastically reduce) the need for explicit ground returns.

As a further embodiment of the hexagonally-packed arrangement, the mesh interconnect interface 200 may include a fourth group of wires to couple the first driver bank to the first group of micro-bumps. A fifth group of wires is to couple the first driver bank to the second group of micro-bumps. A sixth group of wires is to couple the first driver bank to the third group of micro-bumps. Respective ones of the fourth, fifth, and sixth groups of wires are interwoven together such that: no two wires of the fourth group of wires are adjacently positioned along the first driver bank; no two wires of the fifth group of wires are adjacently positioned along the first driver bank; and no two wires of the sixth group of wires are adjacently positioned along the first driver bank.

In this further embodiment of the hexagonally-packed arrangement, the mesh interconnect interface 200 may include a seventh group of wires to couple the second driver bank to the fourth group of micro-bumps. An eighth group of wires is to couple the second driver bank to the fifth group of micro-bumps. A ninth group of wires is to couple the second driver bank to the sixth group of micro-bumps. Respective ones of the seventh, eighth, and ninth groups of wires are interwoven together such that: no two wires of the seventh group of wires are adjacently positioned along the second driver bank; no two wires of the eighth group of wires are adjacently positioned along the second driver bank; and no two wires of the ninth group of wires are adjacently positioned along the second driver bank.

These embodiments include a number of advantages, including that micro-bump arrays avoid return-current overhead (often in the 25% range), allowing them to fit in less area. With this reduction, the micro-bump arrays may fit over the cache memory that lies in the vertical mesh and horizontal mesh signaling corridors (see FIG. 1), thus avoiding any explicit area overhead. Furthermore, signals spread over the entire metal plane resource, rather than being confined to a third of the resources, e.g., where MDFI uses two-thirds the metal plane resources for return currents and isolation). With triple the resource, signals can be optimized for both lower latency and lower power. Finally, the combination of common-clock timing and very fast wires enables single-cycle "hops" between cores communicating across a die-cut, e.g., communicating between a core of the first chiplet 102A and another core of the second chiplet 102B. This is lower latency than some monolithic core-arrays, and significantly faster than existing die-die interfaces, e.g., six cycles less than crossing MDFI.

Figure 7:
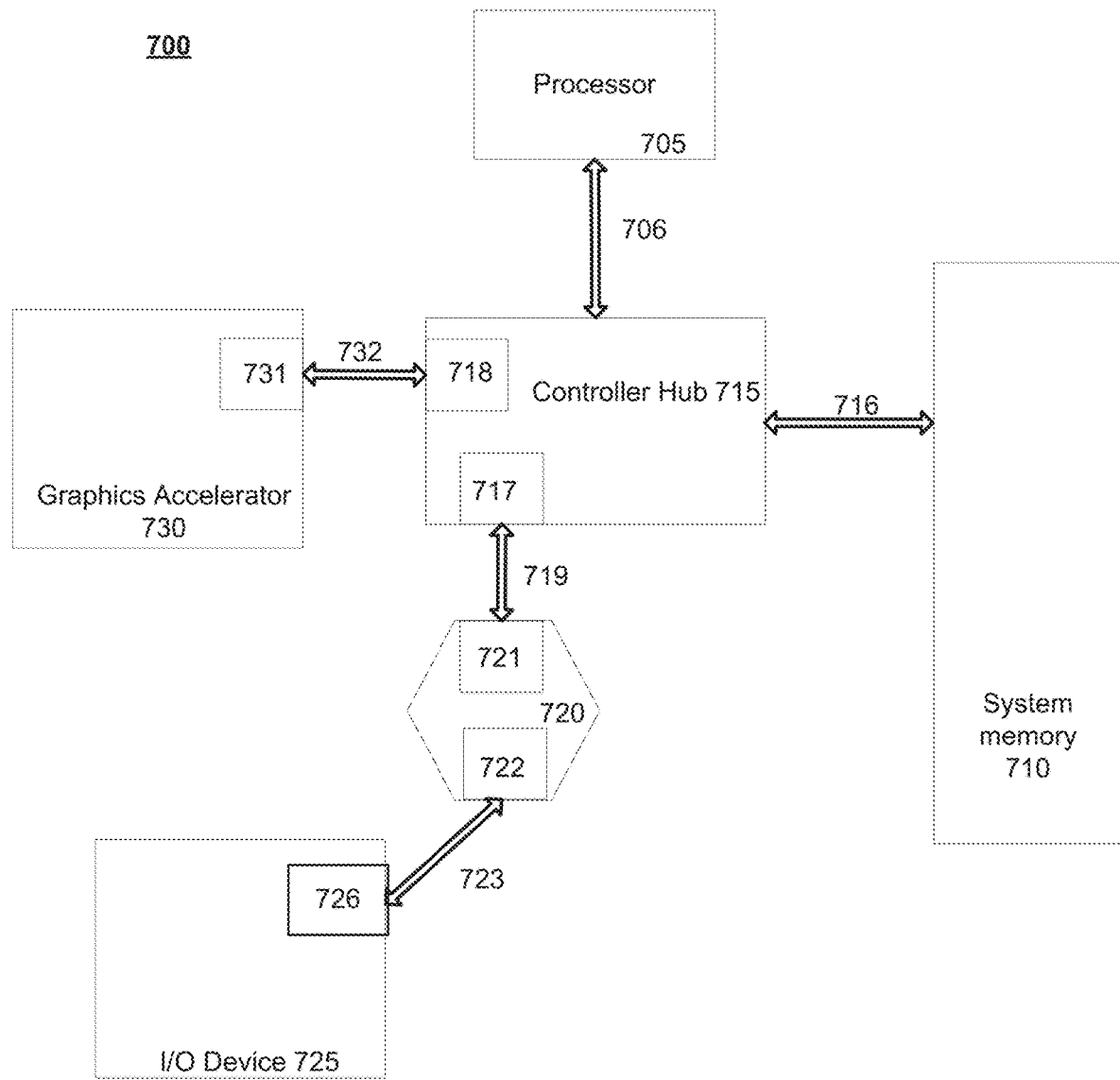
FIG. 7 is a computer system with multiple interconnects, according to certain embodiments.

FIG. 7 is a computer system 700 with multiple interconnects, according to certain embodiments. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, FSB 706 (e.g., link) includes a serial, differential interconnect architecture that is compliant with different interconnect standards.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller. Examples of controller hub 715 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex (e.g., controller 715).

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 725 may include a PCIe® to PCI/PCI-X bridge to support legacy or other version PCI devices. Endpoint devices in PCIe® are often classified as legacy, PCIe®, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

I/O device 725 includes an interface 726 and switch/bridge 720 includes an interface 722. Interface 726 is coupled to interface 722 via serial link 723.

In one embodiment, short range wireless engines including a WLAN unit and a Bluetooth® unit may couple to processor 705 via an interconnect according to a PCIe® protocol, e.g., in accordance with the PCI Express® Specification Base Specification version 3.0 (published Jan. 17, 2004), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 705 via, e.g., a USB link or a universal asynchronous receiver transmitter (UART) link.

One or more of the components of system 700 may be coupled by a connector that is formed as a signal trace on a PCB as described within. For example, one or more of FSB 706, memory interface 716, serial link 719, serial link 723, or serial link 732 may be formed over an adhesive layer, e.g., the adhesive layer 310 within a PCB formation process.

Figure 8:
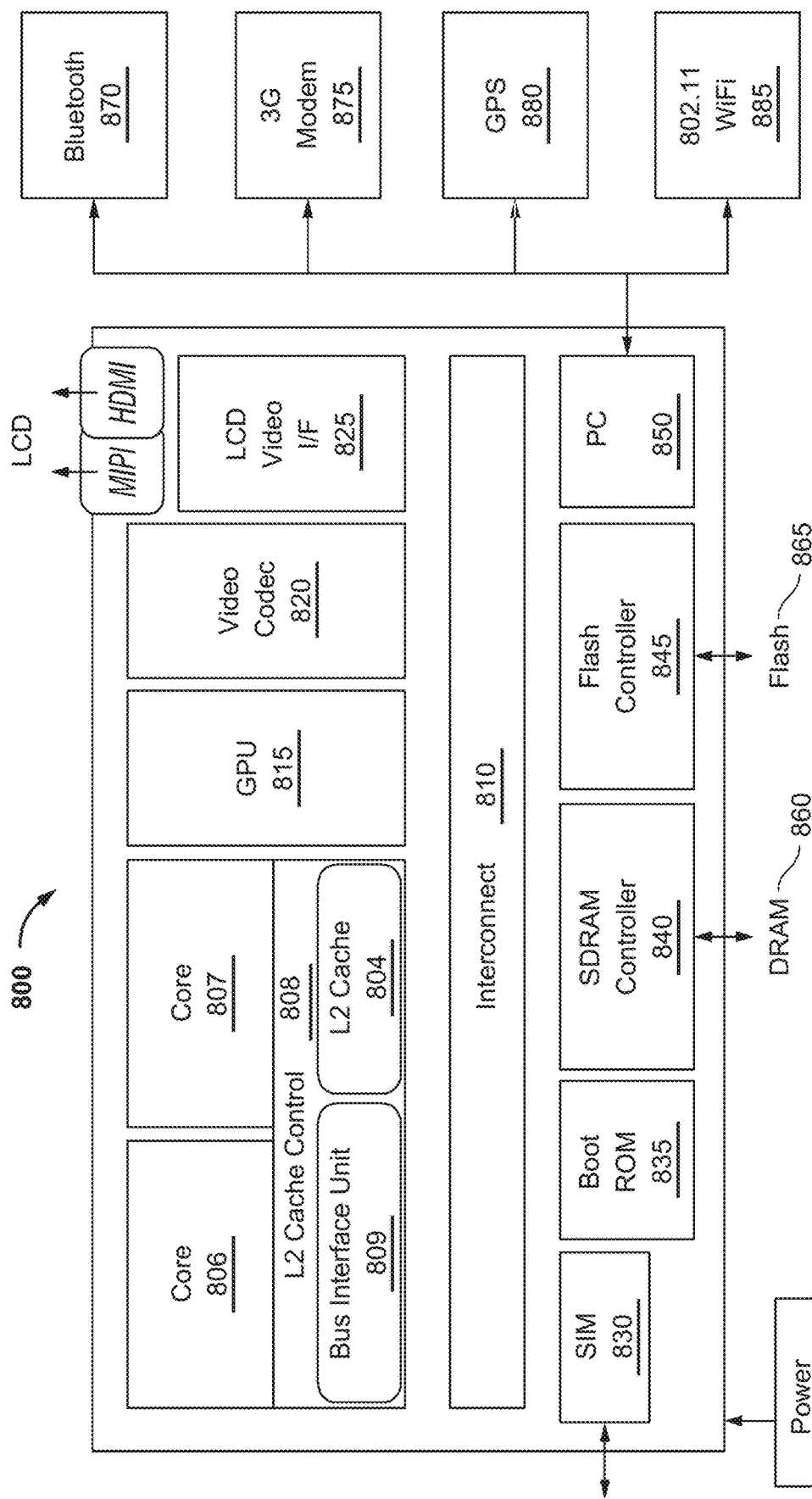
FIG. 8 is a system on a chip (SOC) design, according to certain embodiments.

Turning next to FIG. 8, an embodiment of a system on-chip (SOC) design in accordance with the disclosures is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 804 to communicate with other parts of system 800. Interconnect 810 includes an on-chip interconnect, such as an IOSF, AMBA, or other interconnect discussed above, which potentially implements one or more aspects of the described disclosure.

Interconnect 810 (e.g., interface) provides communication channels to the other components, such as a Subscriber Identity Module (SIM) 830 to interface with a SIM card, a boot ROM 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In some embodiments, interconnect 810 may be formed as a sign trace on a PCB as described herein. For example, interconnect 810 may be formed over an adhesive layer, e.g., the adhesive layer 310 within the disclosed PCB formation process to couple one or more components of the SOC 800.

In addition, the system illustrates peripherals for communication, such as a Bluetooth® module 870, 3G modem 875, GPS 885, and Wi-Fi® 885. Note as stated above, a UE includes a radio for communication. As a result, these peripheral communication modules are not all required. However, in a UE some form a radio for external communication is to be included. The SOC 800 may be coupled to the peripherals via a connector 130 etched as a signal trace of a PCB formed as disclosed herein.

The following examples pertain to further embodiments.

Example 1 is a mesh interconnect interface comprising: 1) a portion of a multi-layer substrate of a multi-chip package, the portion defining a dielectric slice; 2) a first group of micro-bumps aligned along a longitudinal axis and positioned closest to a first driver bank, the first driver bank to be coupled to a first mesh stop of a first chiplet; 3) a second group of micro-bumps aligned along the longitudinal axis and positioned farthest from the first driver bank; 4) a third group of micro-bumps aligned along the longitudinal axis and positioned closest to a second driver bank, the second driver bank to be coupled to a second mesh stop of a second chiplet; 5) a fourth group of micro-bumps aligned along the longitudinal axis and positioned farthest from the second driver bank, wherein the longitudinal axis is orthogonal to a gap between the first chiplet and the second chiplet, and wherein the first, second, third, and fourth groups of micro-bumps are disposed on the dielectric slice; 6) a first group of wires embedded in the dielectric slice to couple the first group of micro-bumps to the fourth group of micro-bumps; and 7) a second group of wires embedded in the dielectric slice to couple the second group of micro-bumps to the third group of micro-bumps, wherein the first group of wires and the second group of wires are interleaved within multiple layers of the dielectric slice such that no nearest neighbor wire of a wire of the first group of wires is of the first group of wires, and no nearest neighbor wire of a wire of the second group of wires is of the second group of wires.

In Example 2, the mesh interconnect interface of Example 1, wherein the first group of wires comprises: 1) a first wire to couple a first micro-bump of the first group of micro-bumps that is closest to the first driver bank to a last micro-bump of the fourth group of micro-bumps that is farthest from the second driver bank; and 2) a second wire to couple a last micro-bump of the first group of micro-bumps that is farthest from the first driver bank to a first micro-bump of the fourth group of micro-bumps that is closest to the second driver bank.

In Example 3, the mesh interconnect interface of Example 1, wherein the second group of wires comprises: 1) a first wire to couple a first micro-bump of the second group of micro-bumps that is closest to the first driver bank to a last micro-bump of the third group of micro-bumps that is farthest from the second driver bank; and 2) a second wire to couple a last micro-bump of the second group of micro-bumps that is farthest from the first driver bank to a first micro-bump of the third group of micro-bumps that is closest to the second driver bank.

In Example 4, the mesh interconnect interface of Example 1, wherein the first group of wires and the second group of wires are interleaved within the multiple layers of the dielectric slice in a square-packed arrangement.

In Example 5, the mesh interconnect interface of Example 1, wherein nearest neighbor wires of the wire of the first group of wires have mutually non-overlapping lengths with the wire of approximately fifty percent, and nearest neighbor wires of the wire of the second group of wires have mutually non-overlapping lengths with the wire of approximately fifty percent.

In Example 6, the mesh interconnect interface of Example 1, further comprising: 1) a third group of wires to couple the first driver bank to the first group of micro-bumps; and 2) a fourth group of wires to couple the first driver bank to the second group of micro-bumps, wherein respective ones of the third group of wires are interwoven with respective ones of the fourth group of wires.

In Example 7, the mesh interconnect interface of Example 6, wherein wires of the third group of wires and the fourth group of wires have less than one tenth the cross-sectional area compared to wires of the first group of wires and the second group of wires, respectively.

In Example 8, the mesh interconnect interface of Example 6, further comprising: 1) a fifth group of wires to couple the second driver bank to the third group of micro-bumps; and 2) a sixth group of wires to couple the second driver bank to the fourth group of micro-bumps, wherein respective ones of the fifth group of wires are interwoven with respective ones of the sixth group of wires.

In Example 9, the mesh interconnect interface of Example 8, wherein the wires of the fifth group of wires and the sixth group of wires have an identical cross-sectional area as the wires of the third group of wires and the fourth group of wires.

Example 10 is an apparatus comprising: 1) a first group of micro-bumps aligned in a column and positioned closest to a driver bank; 2) a second group of micro-bumps aligned in the column and positioned farthest from the driver bank, the driver bank to feed signals to a first group of wires and a second group of wires that couple the driver bank to the first and second groups of micro-bumps on which is disposed a first chiplet; 3) the first group of wires, wherein a first wire of the first group of wires is coupled to a first micro-bump of the first group of micro-bumps, the first micro-bump positioned closest to the driver bank, and wherein a second wire of the first group of wires is coupled to a second micro-bump of the first group of micro-bumps, wherein the second micro-bump is positioned second closest to the driver bank; and 4) the second group of wires, wherein a first wire of the second group of wires is positioned between the first and second wires of the first group of wires at the driver bank and is coupled to a first micro-bump of the second group of micro-bumps, wherein the first micro-bump of the second group of micro-bumps is positioned closest to the driver bank, and wherein a second wire of the second group of wires is positioned between the second and a third wire of the first group of wires and is coupled to a second micro-bump of the second group of micro-bumps, wherein the second micro-bump of the second group of micro-bumps is positioned second closest to the driver bank.

In Example 11, the apparatus of Example 10, wherein the first and second groups of micro-bumps couple the first and second groups of wires from the first chiplet to a dielectric slice of a portion of a multi-layer substrate, the apparatus further comprising: 1) a third group of micro-bumps aligned in the column and arrayed beyond the second group of micro-bumps; 2) a fourth group of micro-bumps aligned in the column and arrayed beyond the third group of micro-bumps, wherein the third and fourth groups of micro-bumps are coupled, within the dielectric slice, by a third group of wires and a fourth group of wires to the first and second groups of micro-bumps, respectively, and wherein a second chiplet is to be disposed on the third and fourth groups of micro-bumps; 3) the third group of wires, wherein a first wire of the third group of wires is coupled between the first micro-bump of the first group of micro-bumps to a first micro-bump of the third group of micro-bumps, wherein the first micro-bump of the third group of micro-bumps is positioned closest to the driver bank, and wherein a second wire of the third group of wires is coupled between the second micro-bump of the first group of micro-bumps and the second micro-bump of the third group of micro-bumps, wherein the second micro-bump of the third group of micro-bumps is positioned second closest to the driver bank; and 4) the fourth group of wires, wherein a first wire of the fourth group of the second wires is coupled between the first micro-bump of the second group of micro-bumps and a first micro-bump of the fourth group of micro-bumps, wherein the first micro-bump of the fourth group of micro-bumps is positioned closest to the driver bank, and wherein a second wire of the fourth group of wires is coupled between the second micro-bump of the second group of micro-bumps and the second micro-bump of the fourth group of micro-bumps, wherein the second micro-bump of the fourth group of micro-bumps is positioned second closest to the driver bank.

In Example 12, the apparatus of Example 11, wherein a first length of the first wire of the third group of wires has mutual overlap with a second length of the first wire of the fourth group of wires that is approximately fifty percent, wherein a section of the wires of the third and fourth groups of wires that do not mutually overlap are backfilled with ground shields.

In Example 13, the apparatus of Example 11, wherein a first length of the second wire of the third group of wires has mutual overlap with a second length of the second wire of the fourth group of wires that is approximately fifty percent, wherein a section of the wires of the third and fourth groups of wires that do not mutually overlap are backfilled with ground shields.

In Example 14, the apparatus of Example 11, wherein, within the dielectric slice between the second and third groups of micro-bumps, the first wire of the fourth group of wires is positioned horizontally adjacent to the first wire of the third group of wires, the second wire of the fourth group of wires is positioned horizontally adjacent to the first wire of the third group of wires, and the second wire of the third group of wires is positioned horizontally adjacent to the second wire of the fourth group of wires.

In Example 15, the apparatus of Example 14, wherein a fifth wire of the third group of wires is positioned vertically below the first wire of the fourth group of wires, a fifth wire of the fourth group of wires is positioned vertically below the first wire of the third group of wires, a sixth wire of the third group of wires is positioned vertically below the second wire of the fourth group of wires, and the sixth wire of the fourth group of wires is positioned vertically below the second wire of the third group of wires.

In Example 16, the apparatus of Example 11, wherein, within the dielectric slice between the second and third groups of micro-bumps, the first wire of the fourth group of wires is positioned vertically below the first wire of the third group of wires, the second wire of the fourth group of wires is positioned vertically below the first wire of the third group of wires, and the second wire of the third group of wires is positioned vertically below the second wire of the fourth group of wires.

In Example 17, the apparatus of Example 16, wherein a fourth wire of the third group of wires is positioned horizontally adjacent to the first wire of the fourth group of wires, a fourth wire of the fourth group of wires is positioned horizontally adjacent to the first wire of the third group of wires, a fifth wire of the third group of wires is positioned horizontally adjacent to the second wire of the fourth group of wires, and a fifth wire of the fourth group of wires is positioned horizontally adjacent to the second wire of the third group of wires.

In Example 18, the apparatus of Example 11, wherein the driver bank is a first driver bank, the apparatus further comprising: 1) a second driver bank to feed signals to a fifth group of wires and a sixth group of wires that interconnect the second driver bank to the second chiplet, which is disposed on the third and fourth groups of micro-bumps; 2) the fifth group of wires, wherein a first wire of the fifth group of wires is coupled to the first micro-bump of the third group of micro-bumps, and a second wire of the fifth group of wires is coupled to the second micro-bump of the third group of micro-bumps; and 3) the sixth group of wires, wherein a first wire of the sixth group of the third wires is coupled to the first micro-bump of the fourth group of the micro-bumps and is positioned between the first and second wires of the fifth group of the third wires, and wherein a second wire of the sixth group of the third wires is coupled to the second micro-bump of the fourth group of the micro-bumps and is positioned between the second wire and a third wire of the fifth group of the third wires.

In Example 19, a mesh interconnect interface comprising: 1) a portion of a multi-layer substrate of a multi-chip package, the portion defining a dielectric slice; 2) a first group of micro-bumps aligned along a longitudinal axis and positioned closest to a first driver bank, the first driver bank to be coupled to a first mesh stop of a first chiplet; 3) a second group of micro-bumps aligned along the longitudinal axis and positioned farthest from the first driver bank; 4) a third group of micro-bumps aligned along the longitudinal axis and positioned between the first and second groups of micro-bumps; 5) a fourth group of micro-bumps aligned along the longitudinal axis and positioned closest to a second driver bank, the second driver bank to be coupled to a second mesh stop of a second chiplet; 6) a fifth group of micro-bumps aligned along the longitudinal axis and positioned farthest from the second driver bank; 7) a sixth group of micro-bumps aligned along the longitudinal axis and positioned between the fourth and fifth group of micro-bumps, wherein the longitudinal axis is orthogonal to a gap to between the first chiplet and the second chiplet, and wherein the first, second, third, fourth, fifth, and sixth groups of micro-bumps are disposed on the dielectric slice; 8) a first group of wires embedded in the dielectric slice to couple the first group of micro-bumps to the fifth group of micro-bumps; 9) a second group of wires embedded in the dielectric slice to couple the third group of micro-bumps to the sixth group of micro-bumps; and 10) a third group of wires embedded in the dielectric slice to couple the second group of micro-bumps to the fourth group of micro-bumps, wherein the first group of wires, the second group of wires, and the third group of wires are interleaved within multiple layers of the dielectric slice such that no nearest neighbor wire of a wire of the first group of wires is of the first group of wires, no nearest neighbor wire of a wire of the second group of wires is of the second group of wires, and no nearest neighbor wire of a wire of the third group of wires is of the third group of wires.

In Example 20, the mesh interconnect interface of Example 19, wherein the first group of wires, the second group of wires, and the third group of wires are interleaved within the multiple layers of the dielectric slice in a hexagonal-packed arrangement.

In Example 21, the mesh interconnect interface of Example 19, further comprising: 1) a fourth group of wires to couple the first driver bank to the first group of micro-bumps; 2) a fifth group of wires to couple the first driver bank to the second group of micro-bumps; and 3) a sixth group of wires to couple the first driver bank to the third group of micro-bumps, wherein respective ones of the fourth, fifth, and sixth groups of wires are interwoven together such that: a) no two wires of the fourth group of wires are adjacently positioned along the first driver bank; b) no two wires of the fifth group of wires are adjacently positioned along the first driver bank; and c) no two wires of the sixth group of wires are adjacently positioned along the first driver bank.

In Example 22, the mesh interconnect interface of Example 21, wherein wires of the fourth group of wires, the fifth group of wires, and the sixth group of wires have less than one tenth the cross-sectional area compared to wires of the first group of wires, the second group of wires, and the third group of wires, respectively.

In Example 23, the mesh interconnect interface of Example 21, further comprising: 1) a seventh group of wires to couple the second driver bank to the fourth group of micro-bumps; 2) an eighth group of wires to couple the second driver bank to the fifth group of micro-bumps; and 3) a ninth group of wires to couple the second driver bank to the sixth group of micro-bumps, wherein respective ones of the seventh, eighth, and ninth groups of wires are interwoven together such that: a) no two wires of the seventh group of wires are adjacently positioned along the second driver bank; b) no two wires of the eighth group of wires are adjacently positioned along the second driver bank; and c) no two wires of the ninth group of wires are adjacently positioned along the second driver bank.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments may be described with reference to components in high speed I/O (HSIO) devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "contacting," "coupling," "conducting," "transmitting," "receiving," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A mesh interconnect interface comprising:
    a portion of a multi-layer substrate of a multi-chip package, the portion defining a dielectric slice;
    a first group of micro-bumps aligned along a longitudinal axis and positioned closest to a first driver bank, the first driver bank to be coupled to a first mesh stop of a first chiplet;
    a second group of micro-bumps aligned along the longitudinal axis and positioned farthest from the first driver bank;
    a third group of micro-bumps aligned along the longitudinal axis and positioned closest to a second driver bank, the second driver bank to be coupled to a second mesh stop of a second chiplet;
    a fourth group of micro-bumps aligned along the longitudinal axis and positioned farthest from the second driver bank, wherein the longitudinal axis is orthogonal to a gap between the first chiplet and the second chiplet, and wherein the first, second, third, and fourth groups of micro-bumps are disposed on the dielectric slice;
    a first group of wires embedded in the dielectric slice to couple the first group of micro-bumps to the fourth group of micro-bumps; and
    a second group of wires embedded in the dielectric slice to couple the second group of micro-bumps to the third group of micro-bumps, wherein the first group of wires and the second group of wires are interleaved within multiple layers of the dielectric slice such that no nearest neighbor wire of a wire of the first group of wires is of the first group of wires, and no nearest neighbor wire of a wire of the second group of wires is of the second group of wires.

2. The mesh interconnect interface of claim 1, wherein the first group of wires comprises:
    a first wire to couple a first micro-bump of the first group of micro-bumps that is closest to the first driver bank to a last micro-bump of the fourth group of micro-bumps that is farthest from the second driver bank; and
    a second wire to couple a last micro-bump of the first group of micro-bumps that is farthest from the first driver bank to a first micro-bump of the fourth group of micro-bumps that is closest to the second driver bank.

3. The mesh interconnect interface of claim 1, wherein the second group of wires comprises:
    a first wire to couple a first micro-bump of the second group of micro-bumps that is closest to the first driver bank to a last micro-bump of the third group of micro-bumps that is farthest from the second driver bank; and
    a second wire to couple a last micro-bump of the second group of micro-bumps that is farthest from the first driver bank to a first micro-bump of the third group of micro-bumps that is closest to the second driver bank.

4. The mesh interconnect interface of claim 1, wherein the first group of wires and the second group of wires are interleaved within the multiple layers of the dielectric slice in a square-packed arrangement.

5. The mesh interconnect interface of claim 1, wherein nearest neighbor wires of the wire of the first group of wires have mutually non-overlapping lengths with the wire of approximately fifty percent, and nearest neighbor wires of the wire of the second group of wires have mutually non-overlapping lengths with the wire of approximately fifty percent.

6. The mesh interconnect interface of claim 1, further comprising:
a third group of wires to couple the first driver bank to the first group of micro-bumps; and
a fourth group of wires to couple the first driver bank to the second group of micro-bumps, wherein respective ones of the third group of wires are interwoven with respective ones of the fourth group of wires.

7. The mesh interconnect interface of claim 6, wherein wires of the third group of wires and the fourth group of wires have less than one tenth a cross-sectional area compared to wires of the first group of wires and the second group of wires, respectively.

8. The mesh interconnect interface of claim 6, further comprising:
a fifth group of wires to couple the second driver bank to the third group of micro-bumps; and
a sixth group of wires to couple the second driver bank to the fourth group of micro-bumps, wherein respective ones of the fifth group of wires are interwoven with respective ones of the sixth group of wires.

9. The mesh interconnect interface of claim 8, wherein the wires of the fifth group of wires and the sixth group of wires have an identical cross-sectional area as the wires of the third group of wires and the fourth group of wires.

10. An apparatus comprising:
a first group of micro-bumps aligned in a column and positioned closest to a driver bank;
a second group of micro-bumps aligned in the column and positioned farthest from the driver bank, the driver bank to feed signals to a first group of wires and a second group of wires that couple the driver bank to the first and second groups of micro-bumps on which is disposed a first chiplet;
the first group of wires, wherein a first wire of the first group of wires is coupled to a first micro-bump of the first group of micro-bumps, the first micro-bump positioned closest to the driver bank, and wherein a second wire of the first group of wires is coupled to a second micro-bump of the first group of micro-bumps, wherein the second micro-bump is positioned second closest to the driver bank; and
the second group of wires, wherein a first wire of the second group of wires is positioned between the first and second wires of the first group of wires at the driver bank and is coupled to a first micro-bump of the second group of micro-bumps, wherein the first micro-bump of the second group of micro-bumps is positioned closest to the driver bank, and wherein a second wire of the second group of wires is positioned between the second and a third wire of the first group of wires and is coupled to a second micro-bump of the second group of micro-bumps, wherein the second micro-bump of the second group of micro-bumps is positioned second closest to the driver bank.

11. The apparatus of claim 10, wherein the first and second groups of micro-bumps couple the first and second groups of wires from the first chiplet to a dielectric slice of a portion of a multi-layer substrate, the apparatus further comprising:
a third group of micro-bumps aligned in the column and arrayed beyond the second group of micro-bumps;
a fourth group of micro-bumps aligned in the column and arrayed beyond the third group of micro-bumps, wherein the third and fourth groups of micro-bumps are coupled, within the dielectric slice, by a third group of wires and a fourth group of wires to the first and second groups of micro-bumps, respectively, and wherein a second chiplet is to be disposed on the third and fourth groups of micro-bumps;
the third group of wires, wherein a first wire of the third group of wires is coupled between the first micro-bump of the first group of micro-bumps to a first micro-bump of the third group of micro-bumps, wherein the first micro-bump of the third group of micro-bumps is positioned closest to the driver bank, and wherein a second wire of the third group of wires is coupled between the second micro-bump of the first group of micro-bumps and the second micro-bump of the third group of micro-bumps, wherein the second micro-bump of the third group of micro-bumps is positioned second closest to the driver bank; and
the fourth group of wires, wherein a first wire of the fourth group of the second wires is coupled between the first micro-bump of the second group of micro-bumps and a first micro-bump of the fourth group of micro-bumps, wherein the first micro-bump of the fourth group of micro-bumps is positioned closest to the driver bank, and wherein a second wire of the fourth group of wires is coupled between the second micro-bump of the second group of micro-bumps and the second micro-bump of the fourth group of micro-bumps, wherein the second micro-bump of the fourth group of micro-bumps is positioned second closest to the driver bank.

12. The apparatus of claim 11, wherein a first length of the first wire of the third group of wires has mutual overlap with a second length of the first wire of the fourth group of wires that is approximately fifty percent, wherein a section of the wires of the third and fourth groups of wires that do not mutually overlap are backfilled with ground shields.

13. The apparatus of claim 11, wherein a first length of the second wire of the third group of wires has mutual overlap with a second length of the second wire of the fourth group of wires that is approximately fifty percent, wherein a section of the wires of the third and fourth groups of wires that do not mutually overlap are backfilled with ground shields.

14. The apparatus of claim 11, wherein, within the dielectric slice between the second and third groups of micro-bumps, the first wire of the fourth group of wires is positioned horizontally adjacent to the first wire of the third group of wires, the second wire of the fourth group of wires is positioned horizontally adjacent to the first wire of the third group of wires, and the second wire of the third group of wires is positioned horizontally adjacent to the second wire of the fourth group of wires.

15. The apparatus of claim 14, wherein a fifth wire of the third group of wires is positioned vertically below the first wire of the fourth group of wires, a fifth wire of the fourth group of wires is positioned vertically below the first wire of the third group of wires, a sixth wire of the third group of wires is positioned vertically below the second wire of the fourth group of wires, and the sixth wire of the fourth group of wires is positioned vertically below the second wire of the third group of wires.

16. The apparatus of claim 11, wherein, within the dielectric slice between the second and third groups of micro-bumps, the first wire of the fourth group of wires is positioned vertically below the first wire of the third group of wires, the second wire of the fourth group of wires is positioned vertically below the first wire of the third group of wires, and the second wire of the third group of wires is positioned vertically below the second wire of the fourth group of wires.

17. The apparatus of claim 16, wherein a fourth wire of the third group of wires is positioned horizontally adjacent to the first wire of the fourth group of wires, a fourth wire of the fourth group of wires is positioned horizontally adjacent to the first wire of the third group of wires, a fifth wire of the third group of wires is positioned horizontally adjacent to the second wire of the fourth group of wires, and a fifth wire of the fourth group of wires is positioned horizontally adjacent to the second wire of the third group of wires.

18. The apparatus of claim 11, wherein the driver bank is a first driver bank, the apparatus further comprising:
  a second driver bank to feed signals to a fifth group of wires and a sixth group of wires that interconnect the second driver bank to the second chiplet, which is disposed on the third and fourth groups of micro-bumps;
  the fifth group of wires, wherein a first wire of the fifth group of wires is coupled to the first micro-bump of the third group of micro-bumps, and a second wire of the fifth group of wires is coupled to the second micro-bump of the third group of micro-bumps; and
  the sixth group of wires, wherein a first wire of the sixth group of the third wires is coupled to the first micro-bump of the fourth group of the micro-bumps and is positioned between the first and second wires of the fifth group of the third wires, and wherein a second wire of the sixth group of the third wires is coupled to the second micro-bump of the fourth group of the micro-bumps and is positioned between the second wire and a third wire of the fifth group of the third wires.

19. An mesh interconnect interface comprising:
  a portion of a multi-layer substrate of a multi-chip package, the portion defining a dielectric slice;
  a first group of micro-bumps aligned along a longitudinal axis and positioned closest to a first driver bank, the first driver bank to be coupled to a first mesh stop of a first chiplet;
  a second group of micro-bumps aligned along the longitudinal axis and positioned farthest from the first driver bank;
  a third group of micro-bumps aligned along the longitudinal axis and positioned between the first and second groups of micro-bumps;
  a fourth group of micro-bumps aligned along the longitudinal axis and positioned closest to a second driver bank, the second driver bank to be coupled to a second mesh stop of a second chiplet;
  a fifth group of micro-bumps aligned along the longitudinal axis and positioned farthest from the second driver bank;
  a sixth group of micro-bumps aligned along the longitudinal axis and positioned between the fourth and fifth group of micro-bumps, wherein the longitudinal axis is orthogonal to a gap between the first chiplet and the second chiplet, and wherein the first, second, third, fourth, fifth, and sixth groups of micro-bumps are disposed on the dielectric slice;
  a first group of wires embedded in the dielectric slice to couple the first group of micro-bumps to the fifth group of micro-bumps;
  a second group of wires embedded in the dielectric slice to couple the third group of micro-bumps to the sixth group of micro-bumps; and
  a third group of wires embedded in the dielectric slice to couple the second group of micro-bumps to the fourth group of micro-bumps, wherein the first group of wires, the second group of wires, and the third group of wires are interleaved within multiple layers of the dielectric slice such that no nearest neighbor wire of a wire of the first group of wires is of the first group of wires, no nearest neighbor wire of a wire of the second group of wires is of the second group of wires, and no nearest neighbor wire of a wire of the third group of wires is of the third group of wires.

20. The mesh interconnect interface of claim 19, wherein the first group of wires, the second group of wires, and the third group of wires are interleaved within the multiple layers of the dielectric slice in a hexagonal-packed arrangement.

21. The mesh interconnect interface of claim 19, further comprising:
  a fourth group of wires to couple the first driver bank to the first group of micro-bumps;
  a fifth group of wires to couple the first driver bank to the second group of micro-bumps; and
  a sixth group of wires to couple the first driver bank to the third group of micro-bumps, wherein respective ones of the fourth, fifth, and sixth groups of wires are interwoven together such that:
    no two wires of the fourth group of wires are adjacently positioned along the first driver bank;
    no two wires of the fifth group of wires are adjacently positioned along the first driver bank; and
    no two wires of the sixth group of wires are adjacently positioned along the first driver bank.

22. The mesh interconnect interface of claim 21, wherein wires of the fourth group of wires, the fifth group of wires, and the sixth group of wires have less than one tenth a cross-sectional area compared to wires of the first group of wires, the second group of wires, and the third group of wires, respectively.

23. The mesh interconnect interface of claim 21, further comprising:
  a seventh group of wires to couple the second driver bank to the fourth group of micro-bumps;
  an eighth group of wires to couple the second driver bank to the fifth group of micro-bumps; and
  a ninth group of wires to couple the second driver bank to the sixth group of micro-bumps, wherein respective ones of the seventh, eighth, and ninth groups of wires are interwoven together such that:
    no two wires of the seventh group of wires are adjacently positioned along the second driver bank;
    no two wires of the eighth group of wires are adjacently positioned along the second driver bank; and
    no two wires of the ninth group of wires are adjacently positioned along the second driver bank.

* * * * *